US006895490B1

(12) United States Patent
Moore et al.

(10) Patent No.: US 6,895,490 B1
(45) Date of Patent: May 17, 2005

(54) METHOD FOR MAKING A WRITE-ONCE MEMORY DEVICE READ COMPATIBLE WITH A WRITE-MANY FILE SYSTEM

(75) Inventors: Christopher S. Moore, San Jose, CA (US); Richard Matt Fruin, San Jose, CA (US); Colm P Lysaght, Palo Alto, CA (US); Roy E. Scheuerlein, Cupertino, CA (US)

(73) Assignee: Matrix Semiconductor, Inc., Santa Clara, CA (US)

( * ) Notice: Subject to any disclaimer, the term of this patent is extended or adjusted under 35 U.S.C. 154(b) by 528 days.

(21) Appl. No.: 10/023,468

(22) Filed: Dec. 14, 2001

Related U.S. Application Data (60) Provisional application No. 60/282,723, filed on Apr. 9, 2001, and provisional application No. 60/282,790, filed on Apr. 9, 2001.

(51) Int. Cl.[7] .............................................. G06F 12/00
(52) U.S. Cl. ...................... 711/203; 711/202; 711/207; 711/221; 711/156; 711/103; 365/230.03
(58) Field of Search ................................. 711/203, 202, 711/207, 221, 156, 103; 365/230.03

(56) References Cited

U.S. PATENT DOCUMENTS

| 4,646,266 A | 2/1987 | Ovshinsky et al. ......... 365/105 |
| 4,691,299 A | 9/1987 | Rivest et al. ............... 365/189 |
| 4,740,890 A | 4/1988 | William ...................... 713/200 |
| 5,029,125 A | 7/1991 | Sciupac ...................... 707/205 |
| 5,040,110 A | 8/1991 | Miki et al. .................. 707/200 |

(Continued)

FOREIGN PATENT DOCUMENTS

| EP | 1 168 150 A1 | 2/2002 | ............. G06F/3/06 |
| EP | 1 331 548 A2 | 7/2003 | ............. G06F/3/06 |
| EP | 1 359 500 A2 | 11/2003 | ............. G06F/3/06 |
| JP | 410283717 A | 10/1998 | ........... G11B/19/02 |
| WO | WO 99/14763 | 8/1998 | ........... G11C/11/56 |

OTHER PUBLICATIONS

Press Release, "DataPlay, Inc.—What's Playing on Data-Play . . . Everything Digital!," 2 Pages, Jan. 7, 2002.
"How Does TrueFFS Manage Wear Leveling," http://www.m-sys.com/content/information/calcInfo.asp, 2 pages, Oct. 2001.
"Datalight FlashFX 4.06," User's Guide, page 11, Aug. 2000.
"How Flash Memory Works," http://howstuffworks.com/flash-memory.htm?printable=1, 5 pages, Sep. 2001.
"Flash Memory," Samsung Electronics, 39 pages, Jul. 2004.
"Content Protection System Architecture, A Comprehensive Framework for Content Protection Intel Corp.," 19 pages, Feb. 17, 2000.

(Continued)

Primary Examiner—Stephen Elmore
(74) Attorney, Agent, or Firm—Brinks Hofer Gilson & Lione (57) ABSTRACT

The preferred embodiments described herein provide a method for making a write-once memory device read compatible with a write-many file system. In one preferred embodiment, a method for re-writing to a logical address of a write-once memory device is provided. A physical-to-logical address map is built from data stored in the memory device that associates individual physical addresses with individual logical addresses. When a logical address is re-written, data associating that logical address with a new physical address is stored, and data associating that logical address with an old physical address is invalidated. When the logical address is read, the physical-to-logical address map is used to read the new physical address instead of the old physical address. Other preferred embodiments are provided, and each of the preferred embodiments described herein can be used alone or in combination with one another.

49 Claims, 7 Drawing Sheets

U.S. PATENT DOCUMENTS

| | | | |
|---|---|---|---|
| 5,119,291 A | 6/1992 | Flannagan et al. | 711/4 |
| 5,247,494 A | 9/1993 | Ohno et al. | 369/13.02 |
| 5,307,497 A | 4/1994 | Feigenbaum et al. | 713/1 |
| 5,321,824 A | 6/1994 | Burke et al. | 711/220 |
| 5,437,012 A | 7/1995 | Mahajan | 711/111 |
| 5,437,028 A | 7/1995 | Iijima | 707/205 |
| 5,448,728 A | 9/1995 | Takano et al. | 707/205 |
| 5,457,796 A | 10/1995 | Thompson | 707/203 |
| 5,463,772 A | 10/1995 | Thompson et al. | 707/101 |
| 5,475,820 A | 12/1995 | Natrasevschi et al. | 711/100 |
| 5,537,652 A | 7/1996 | Friedl et al. | 711/111 |
| 5,559,778 A | 9/1996 | Inokuchi et al. | 369/58 |
| 5,590,320 A | 12/1996 | Maxey | 707/203 |
| 5,630,093 A * | 5/1997 | Holzhammer et al. | 711/115 |
| 5,752,005 A | 5/1998 | Jones | 703/22 |
| 5,761,700 A | 6/1998 | Cozart et al. | 711/202 |
| 5,761,741 A | 6/1998 | Robbins et al. | 711/212 |
| 5,832,263 A | 11/1998 | Hansen et al. | 719/322 |
| 5,835,396 A | 11/1998 | Zhang | 365/51 |
| 5,890,169 A | 3/1999 | Wong et al. | 707/206 |
| 6,000,023 A | 12/1999 | Jeon | 711/173 |
| 6,034,882 A | 3/2000 | Johnson et al. | 365/103 |
| 6,055,180 A * | 4/2000 | Gudesen et al. | 365/175 |
| 6,073,208 A | 6/2000 | Norman | 711/103 |
| 6,104,635 A | 8/2000 | Ogane | 365/185.08 |
| 6,138,203 A | 10/2000 | Inokuchi et al. | 711/103 |
| 6,185,122 B1 | 2/2001 | Johnson et al. | 365/103 |
| 6,236,587 B1 | 5/2001 | Gudesen et al. | 365/105 |
| 6,341,085 B1 * | 1/2002 | Yamagami et al. | 365/185.09 |
| 6,345,333 B1 | 2/2002 | Sassa et al. | 711/103 |
| 6,351,838 B1 | 2/2002 | Amelia | 714/770 |
| 6,370,642 B1 | 4/2002 | Chiang et al. | 713/1 |
| 6,377,526 B1 | 4/2002 | Vining et al. | 369/53.1 |
| 6,424,581 B1 * | 7/2002 | Bosch et al. | 365/195 |
| 6,490,703 B1 | 12/2002 | de la Iglesia et al. | 714/746 |
| 6,584,541 B2 * | 6/2003 | Friedman et al. | 711/103 |
| 6,631,107 B1 | 10/2003 | Ito et al. | 369/53.2 |
| 6,647,471 B2 * | 11/2003 | March et al. | 711/154 |
| 6,658,438 B1 * | 12/2003 | Moore et al. | 707/205 |
| 6,772,274 B1 | 8/2004 | Estakhri | 711/103 |
| 2002/0034105 A1 | 3/2002 | Kulkarni et al. | 365/200 |
| 2002/0107862 A1 | 8/2002 | Moore et al. | 707/101 |
| 2002/0108054 A1 | 8/2002 | Moore et al. | 713/200 |
| 2003/0120858 A1 * | 6/2003 | March et al. | 711/103 |

OTHER PUBLICATIONS

"Media security thwarts temptation, permits prosecution," http://www.ednmag.com/ednmag/reg/2000/06222000/13tt.htm, 13 pages, Jun. 22, 2000.

"Memory Devices and Methods for Use Therewith," U.S. Appl. No. 09/748,589, filed Dec. 22, 2000; inventors: Roger W. March, et al.

"Solid–State Memory Device Storing Program Code and Methods for Use Therewith," U.S. Appl. No. 09/775,745, filed Feb. 2, 2001; inventors: Christopher Moore, et al.

"Memory Device and Method for Reading Data Stored in a Portion of a Memory Device Unreadable by a File System of a Host Device," U.S. Appl. No. 09/775,939, filed Feb. 2, 2001; inventors: Christopher Moore, et al.

"Memory Device and Method for Storing and Reading Data in a Write–Once Memory Array," U.S. Appl. No. 09/877,720, filed Jun. 8, 2001; inventors: Christopher S. Moore, et al.

"Memory Device and Method for Storing and Reading a File System Structure in a Write–Once Memory Array," U.S. Appl. No. 09/877,719, filed Jun. 8, 2001; inventors: Christopher S. Moore, et al.

"Method for Reading Data in a Write–Once Memory Device Using a Write–Many File System," U.S. Appl. No. 09/878,138, filed Jun. 8, 2001; Christopher S. Moore, et al.

"Method for Redirecting Data Traffic in a Write–Once Memory Device," U.S. Appl. No. 09/877,691, filed Jun. 8, 2001; J. James Tringali, et al.

"Chapter 32—Disk Concepts and Troubleshooting," Microsoft Windows 2000 Professional Resource Kit, Microsoft Corporation, 29 pages, Mar. 15, 2000.

"Exotic Memories, Diverse Approaches," EDN Asia, pages 22–33 (Sep. 2001).

"A Vertical Leap for Microchips," Thomas H. Lee, Scientific American, 8 pages (Jan. 2002; printed Dec. 10, 2001).

"SmartMedia Physical Format Specifications Version 1.30" SSFDC Forum Technical Committee, 23 pages (May 19, 2000).

"SmartMedia Electrical Specifications Version 1.30," SSFDC Forum Technical Committee, 23 pages (May 19, 2000).

"MS–DOS Summary A Survival Guide," http://www.washtenaw.cc.mi.us/dept/cis/mod/q02cd.htm, 10 pages (1996).

"Hardware White Paper, FAT: General Overview of On–Disk Format," Microsoft Corp., 25 pages, May 5, 1999.

"Method for Deleting Stored Digital Data from Write–Once Memory Device," U.S. Appl. No. 09/638,439, filed Aug. 14, 2000; inventors: Christopher S. Moore, et al.

"Method for Storing Digital Information in Write–Once Memory Array," U.S. Appl. No. 09/727,229, filed Nov. 30, 2000; inventors: David R. Friedman et al.

"Three–Dimensional Memory Array and Method of Fabrication," U.S. Appl. No. 09/560,626, filed Apr. 28, 2000; inventor: Johan Knall.

"Write–Once Memory Array Controller, System, and Method," U.S. Appl. No. 09/638,427, filed Aug. 14, 2000; inventors: Derek J. Bosch, et al.

"Low–Cost Three–Dimensional Memory Array," U.S. Appl. No. 09/638,428, filed Aug. 14, 2000; inventors: Mark G. Johnson, et al.

"Modular Memory Device," U.S. Appl. No. 09/638,334, filed Aug. 14, 2000; inventors: J. James Tringali, et al.

"The MS–DOS Filesystem," http://www.cs.adfa.oz.au/teaching/studinfo/osrts/Lectures/node113.html, 2 pages Mar. 1, 2001.

"comp.os.ms–windows.programmer.vxd Frequently Asked Questions (FAQ)," http://www.faqs.org/faqs/windows/programming/vxd/, 16 pages (1995).

"CD–ROM Driver Installation Procedure," http://www-.pcguide.com/proc/setup/cddriver–c.html, 3 pages, Apr. 17, 2001.

"Fujifilm News & Events, Medical Imaging Science Systems NDT Systems," http://www.fujimed.com/news/news_openarch.html, 2 pages, Nov. 26, 2000.

"CNN.com DVD Encryption hacked," http://www.cnn.com/TECH/computing/9911/05/dvd.hack.idg/, 3 pages, Nov. 5, 1999.

"Octopus Systems, Acorn's Solution for the Java™ Technology Platform," http://www.octosys.co.uk/java.html, 9 pages (2001).

"New Direct CD 2.5 Improves Speed and Reliability of Data Archiving Using CD–R/CD–RW," http://www.adaptec.com/worl . . . pany/pressrelease.html?prodkey=08051998, 2 pages, Aug. 5, 1998.

"Universal Disk Format (UDF) Driver," http://www.trylinux.com/projects/udf/index.html, 3 pages (1999).

"FAT File Allocation Table," http://www.easydesksoftware.com/fat.htm, 2 pages, Oct. 24, 1999.

"FAT File Allocation Table," http://www.oreilly.com/reference/directory/terms/F/File_Allocation_Table.htm, 4 pages (1996).

"ISO9960 Simplified for DOS/Windows by Philip J. Erdelsky," http://www.alumni.caltech.edu/~pje/iso9660.html, 8 pages Aug. 26, 2000.

"Memory cards: designing with a full deck," http://www.ednmag.com/ednmag/reg/2000/052520000/11dfl.htm, 12 pages, May 25, 2000.

"DOS Disk Formats," http://www.qvctc.commnet.edu/classes/csc277/formats.html, 7 pages (1999).

"MS–DOS Partitioning Summary," http://www.qvctc.commnet.edu/classes/csc277/fdisk2.html, 3 pages (1999).

"DOS Partitions," http://www.qvctc.commnet.edu/classes/csc277/partitions.html, 5 pages (1999).

"DOS Disk Structures–Definitions," http://www.qvctc.commnet.edu/classes/csc277/formats2.html, 3 pages (1999).

NN8803151, IBM Technical Disclosure Bulletin, "Incremental Directory Indexes for Write–Once Media", Mar., 1988, vol. 30, Issue 10, pp. 151–155.

* cited by examiner

```
┌─────────────────────────────────────────────────────────────────────────┐
│ Provide a write-once memory device, wherein the memory device stores    │
│ first data in a memory location identified by said logical address and  │
│ further stores map data that associates a first physical address with   │
│ a first logical address                                                 │
└─────────────────────────────────────────────────────────────────────────┘
                                    │  ⎣ 210
                                    ▼
┌─────────────────────────────────────────────────────────────────────────┐
│ Store the second data in a memory location identified by a second       │
│ physical address                                                        │
└─────────────────────────────────────────────────────────────────────────┘
                                    │  ⎣ 220
                                    ▼
┌─────────────────────────────────────────────────────────────────────────┐
│ Store second map data in the memory device associating the second       │
│ physical address with the first logical address                         │
└─────────────────────────────────────────────────────────────────────────┘
                                       ⎣ 230
```

*Fig. 8*

```
                                   ┌─ 240
┌─────────────────────────────────────────────────────────────────────────┐
│ Provide a write-once memory device, wherein the memory device stores    │
│ first data in a memory location identified by said logical address and  │
│ further stores map data that associates a first physical address with a │
│ first logical address, and further stores a used indicator flag         │
│ associated with that first physical address                             │
└─────────────────────────────────────────────────────────────────────────┘
                                    │  ┌─ 250
                                    ▼
┌─────────────────────────────────────────────────────────────────────────┐
│ Store the second data in a memory location identified by a second       │
│ physical address                                                        │
└─────────────────────────────────────────────────────────────────────────┘
                                    │  ┌─ 260
                                    ▼
┌─────────────────────────────────────────────────────────────────────────┐
│ Store second map data in the memory device associating the second       │
│ physical address with the first logical address                         │
└─────────────────────────────────────────────────────────────────────────┘
```

METHOD FOR MAKING A WRITE-ONCE MEMORY DEVICE READ COMPATIBLE WITH A WRITE-MANY FILE SYSTEM

RELATED APPLICATIONS

This application claims the benefit of U.S. Provisional Application No. 60/282,723, filed Apr. 9, 2001 (now abandoned), and U.S. Provisional Application No. 60/282,790, filed April 9, 2001 (now abandoned), both of which are hereby incorporated by reference.

BACKGROUND

Non-volatile memory is becoming standard in consumer appliances such as digital cameras, digital audio players, and personal digital assistants. The demands for affordable non-volatile storage media coupled with the low cost per bit of information achievable in creating write-once storage elements have given rise to the proliferation of write-once memory devices in the consumer marketplace. Write-many file systems are typically not used to store data in write-once memory devices because those file systems are designed to re-write bookkeeping data structures stored in a given set of memory cells whenever data is added or deleted. Instead, specially-designed write-once file systems, such as ISO9660 and Universal Disk Format (UDF), are used. Unfortunately, data stored using a write-once file system typically cannot be read by a write-many file system. This interoperability problem can affect a large number of users since the prevalence of the MS-DOS FAT file system (ANSI/ISO/IEC 9293-1994) in the personal computer space has lead to the broad acceptance of this write-many file system in the nascent consumer appliance market as well.

There is a need, therefore, for a method that can be used to make a write-once memory device read compatible with a write-many file system and, more generally, to make write-once memory devices behave like write-many memory devices.

SUMMARY

The present invention is defined by the following claims, and nothing in this section should be taken as a limitation on those claims.

By way of introduction, the preferred embodiments described below provide a method for making a write-once memory device read compatible with a write-many file system. In one preferred embodiment, a method for re-writing to a logical address of a write-once memory device is provided. A physical-to-logical address map is built from data stored in the memory device that associates individual physical addresses with individual logical addresses. When a logical address is re-written, data associating that logical address with a new physical address is stored, and data associating that logical address with an old physical address is invalidated. When the logical address is read, the physical-to-logical address map is used to read the new physical address instead of the old physical address. Other preferred embodiments are provided, and each of the preferred embodiments described herein can be used alone or in combination with one another.

The preferred embodiments will now be described with reference to the attached drawings.

DETAILED DESCRIPTION OF THE PRESENTLY PREFERRED EMBODIMENTS

By way of overview, the preferred embodiments described herein relate to methods that can be used to make a write-once memory device read compatible with a write-many file system. In one preferred embodiment, such compatibility is accomplished using a physical-to-logical address map. A "physical address" is the actual address of a memory location in a memory array, and a "logical address" is the address used by an application in a host device in referring to a memory location in the memory array. The physical and logical addresses may not be identical to one another, and a physical-to-logical address map provides a mechanism for translating a logical address into a physical address and vice versa. The physical-to-logical address map is built from data stored in the memory device that associates individual physical addresses with individual logical addresses. As described below, this data can take various forms, such as an entry in a table or in a field associated with a memory location. When a logical address is re-written, the data associating that logical address with a new physical address is stored, and the data associating that logical address with an old physical address is invalidated. When the logical address is read, the physical-to-logical address map is used to read the new physical address instead of the old physical address.

Memory devices and host devices operating in accordance with SmartMedia™ Physical Format Specifications Version 1.30, which is hereby incorporated by reference, are designed to create a physical-to-logical address map to replace defective blocks. A SmartMedia™ compliant memory device contains storage locations for data that associates individual physical addresses with individual logical addresses, and a SmartMedia™ compliant host device contains software that creates a physical-to-logical address map from this data. As mentioned above, the physical-to-logical address map is used by the SmartMedia™ compliant host device for block logical address to physical address conversions to replace blocks of memory found to be defective. In one preferred embodiment of this invention, software in a SmartMedia™ compliant host device is modified so that the physical-to-logical address mapping technique is also used to make a write-once memory device read compatible with a write-many file system. Before turning to the modification, a brief description of physical-to-logical address mapping under the Smart-Media™ specification is provided.

Figure 1:
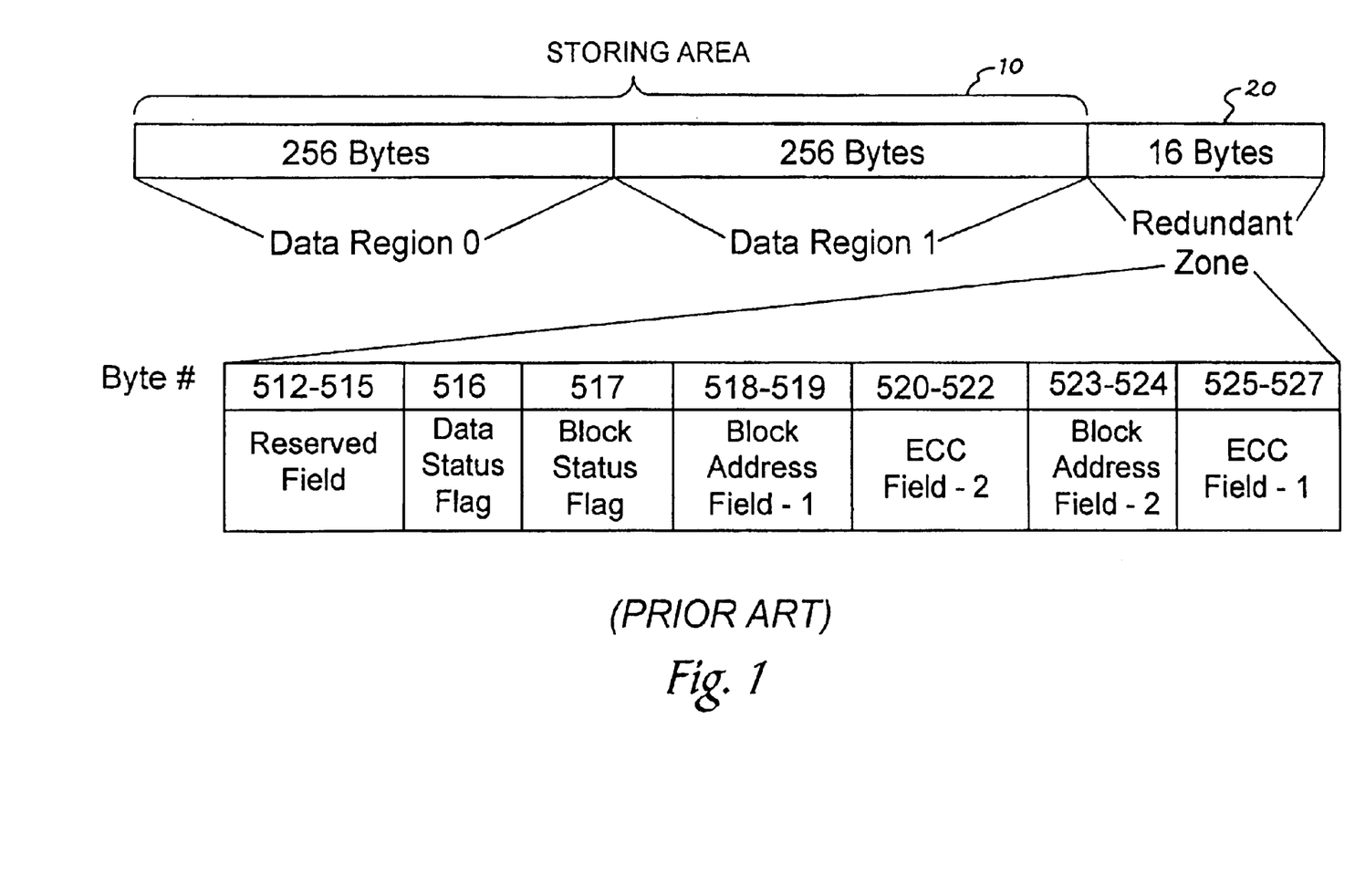
FIG. 1 is an illustration of a prior art page of memory in accordance with a model set forth in the SmartMedia™ specification.

A SmartMedia™ memory device is organized into blocks of memory, where each block comprises a plurality of pages of memory (e.g., 16 or 32 pages). FIG. 1 is an illustration of a page of memory in accordance with one model set forth in the SmartMedia™ specification. As shown in FIG. 1, a page is organized into a storing area 10 and a redundant area (or zone) 20. The storing area 10 comprises two 256-byte data regions: Data Region 0 and Data Region 1. The redundant zone 20 is 16 bytes and comprises seven redundant fields: a reserved field (bytes 512–515), a data status flag field (byte 516), a block status flag field (byte 517), block address field-1 (bytes 518–519), ECC field-2 (bytes 520–522), block address field-2 (bytes 523–524), and ECC field-1 (bytes 525–527). Block address field-1 and block address field-2 are used to store the logical address of the block containing the page. In this way, block address field-1 and block address field-2 store data that associates a logical address to a physical address of the block.

If a block is found to be defective, an invalid flag is stored in the block status flag field of that block. (It should be noted that the "invalid flag" in this example does not necessarily indicate that data written to a page is incorrect.) This has the effect of invalidating the logical address stored in that block's block address field-1 and block address field-2. Data that is to be stored in a logical address associated with a defective block is stored instead in a new block, and the logical address is stored in the new block's block address field-1 and block address field-2. When software in the host device builds a physical-to-logical address map, the software reads the invalid flag stored in the block status flag field of the defective block and ignores the logical address stored in that block's block address field-1 and block address field-2. However, because an invalid flag is not stored in the block status flag field of the new block, the logical address stored in the new block's block address field-1 and block address field-2 is used to create an entry in the physical-to-logical address map correlating the logical address with the physical address of the new block.

The process described above for "marking a block bad" is performed by software in a SmartMedia™ compliant host device only when a block is defective. In one preferred embodiment, this software is modified so that a block is marked as bad when an attempt is made to re-write that block. This method allows a host device to re-write to a logical address even though the memory device is write-once. This technique can be used to re-write file system structures to make the write-once memory device read compatible with a write-many file system. A "file system structure" refers to any data that describes a partition in memory, the memory space within the partition, and/or the type of commands that a file system can or cannot use with that partition. Examples of file system structures include, but are not limited to, a file allocation table ("FAT" or "FAT table"), a root directory, and a sub-directory. An example of this preferred embodiment will now be provided with respect to storing a FAT table in a write-once memory device.

Figure 2:
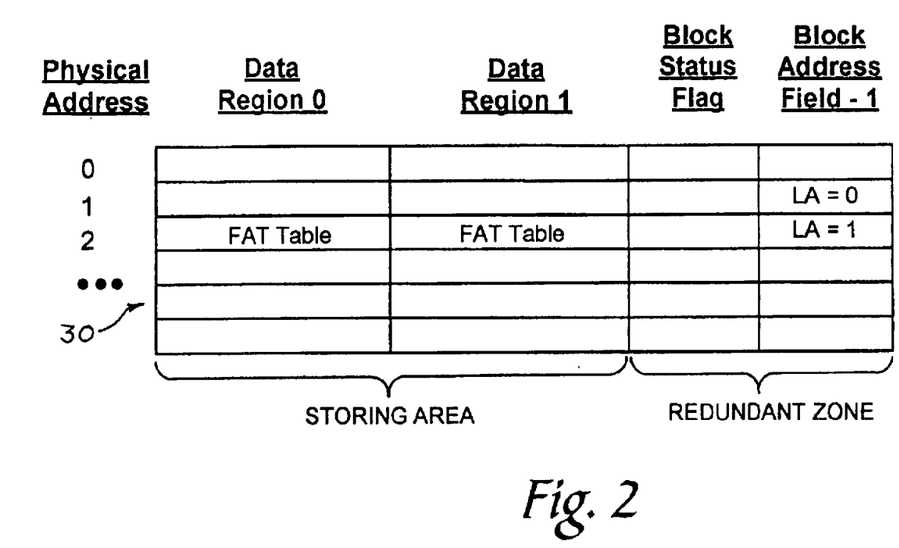
FIG. 2 is an illustration of a memory array of a preferred embodiment.
Figure 3:
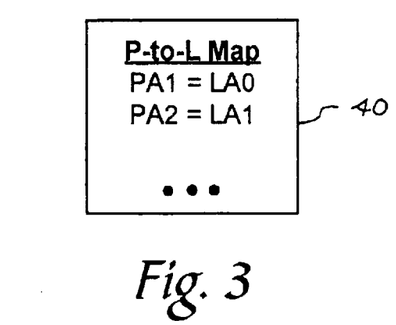
FIG. 3 is an illustration of a physical-to-logical address map of the memory array of FIG. 2.

FIG. 2 is an illustration showing the physical addresses, storing areas, and redundant zones of several blocks of a memory device. To simplify this illustration, of the seven fields in the redundant zone, only the block status flag field and block address field-1 are shown. As shown in FIG. 2, a FAT table is stored in the storing area of a block at physical address 2, and logical address 1 is stored in that block's block address field-1. (In this example, a FAT table fits in a single block.) Additionally, logical address 0 is stored in block address field-1 of the block at physical address 1. Invalid flags are not stored in the block status flag fields of the blocks at physical address 1 and 2. Accordingly, when software in a host device creates a physical-to-logical map 40 of the memory device, it will create an entry in the map 40 correlating physical address 1 with logical address 0 and an entry correlating physical address 2 with logical address 1 (see FIG. 3).

Figure 4:
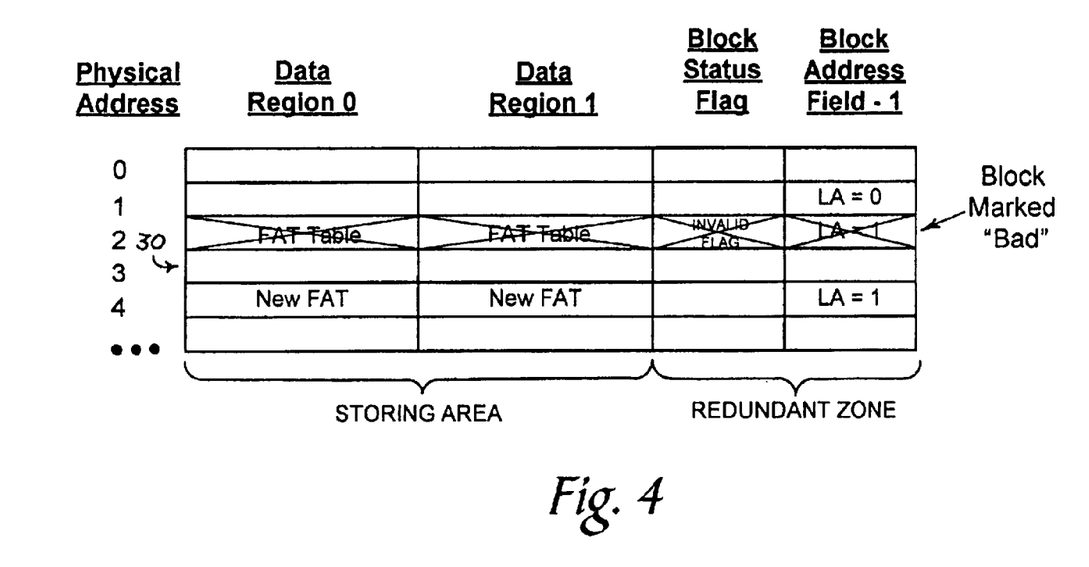
FIG. 4 is an illustration of the memory array of FIG. 2 with a new FAT table stored therein.
Figure 5:
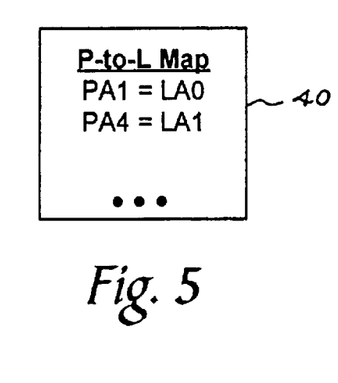
FIG. 5 is an illustration of a physical-to-logical address map of the memory array of FIG. 4.

When data is added or deleted from the memory device, a new FAT table is written to the memory device. To ensure FAT file system compatibility, the new FAT must be stored at logical address 1, since logical address 1 is where the FAT file system expects the FAT table to be located in this example. When a command is received to store the new FAT table at logical address 1, the physical-to-logical map 40 is consulted to identify the physical address of the block (physical address 2). With reference to FIG. 4, the software in the host device then stores an invalid flag in the block status flag field of the block at physical address 2 to mark the block "bad," which effectively invalidates the data associating logical address 1 with physical address 2. The software in the SmartMedia™ compliant host device then stores the new FAT table in an available block (here, at physical address 4) and stores logical address 1 in that block's block address field-1. (It should be noted that the acts described above can be performed in a different order (e.g., store the new FAT table then store the invalid flag).) As shown in FIG. 5, when the physical-to-logical map 40 is updated, an entry is created correlating physical address 4 with logical address 1, and the entry correlating physical address 2 with logical address 1 no longer appears in the map 40. Accordingly, when a DOS FAT file system reads logical address 1, the new FAT table is read from physical address 4 instead of the old FAT table from physical address 2. As shown by this example, the logical address used by the DOS FAT file system remains the same, but the physical address associated with that logical address changes. By providing software re-mapping, the write-once memory device becomes read compatible with the DOS FAT file system.

If the host and memory devices use the ECC fields in the redundant zone, it is preferred that a new FAT table be written each time the FAT table is updated to ensure that the ECC stored in the redundant fields matches the data in the FAT table. If the ECC fields are not used, an existing FAT table can be updated by simply appending data to the existing FAT table. In that situation, a new FAT table is preferably written in a new block only if the update changed existing data in the FAT table. The same is true with other file system structures, such as root directories and sub-directories.

There are several alternatives that can be used. For example, while the block status flag field and block address field-1 were used in the above example, other fields in the redundant zone can be used instead of or in combination with these fields. For example, block address field-2 can be used instead of or along with block address field-1. Further, the data status flag field, which marks the data written to a page as invalid, can be used instead of the block status flag field, which marks a block as bad. Further, although fields in the redundant zone used in the above example were in compliance with SmartMedia™ specifications, redundant fields can be defined in a variety of ways not compliant with the SmartMedia™ specifications. Accordingly, the term "redundant field" refers to one or more fields in a redundant area of a memory location, and a specific field in accordance with a specific specification should not be read into a claim containing this term unless that field is explicitly recited therein.

Additionally, while the DOS FAT file system was used in the above example, it should be noted that other write-many file systems can be used. Further, in addition to making a write-once memory device read compatible with a write-many file system, the method described above can be used with any data (not just file system structures) to emulate a write-many memory device using a write-once memory device.

The embodiment illustrated above used a legacy SmartMedia™ host device containing software that performed physical-to-logical address mapping when a block was marked bad due to a defect. The legacy SmartMedia™ host device was modified to allow the software to also mark a block as bad when an attempt was made to re-write a logical address. That embodiment allowed a write-once memory device to be compatible with a write-many file system with no modification to existing SmartMedia™ compliant memory devices. That embodiment may be especially preferred if a memory device does not have a hardware component that defines how the memory is written. However, some memory devices can include a hardware component, such as a controller, with a memory (e.g., RAM) to create a physical-to-logical address map. The controller would automatically convert addresses sent from a host device to the proper physical location in the memory based on the map. The controller can sit in front of a memory array in a memory card such as a Multi-Media Card, Secure Digital Card, or CompactFlash Card. By performing the re-mapping in hardware in the memory device, the host device would be blind to the re-mapping operation. In another alternative, a hardware component (instead of a software component) can be used in the host device to perform the re-mapping. More generally, hardware and/or software in the host device or the memory device can be used to create a physical-to-logical address map and to store and invalidate data in the memory device that associates individual physical addresses with individual logical addresses. This functionality can also be distributed between hardware and/or software components in the host device and/or memory device.

In the preferred embodiments described above, the data associating an individual physical address with an individual logical address was stored in a redundant field of a memory location. In an alternate embodiment, this data is stored in a separate table in the memory device. Analogous to a FAT table, as changes are made, data in this table can be updated to point to new areas. This table can be organized as a physical-to-logical table or a logical-to-physical table. Invalidating an entry in the table as bad can be done by any suitable method. For example, the entry can be "obliterated" overwriting at least a portion of the stored data with a destructive pattern, as described in U.S. patent application Ser. No. 09/638,439 (now U.S. Pat. No. 6,658,438), which is assigned to the assignee of the present invention and is hereby incorporated by reference. Additionally, a temporal-to-spatial mapping technique can be used to find the most-recent entry to the table. In this way, the act of storing new data invalidates the old data. The temporal-to-spatial mapping technique is described in U.S. patent application Ser. No. 09/748,589 (pending), which is also assigned to the assignee of the present application and hereby incorporated by reference. Additionally, an invalid flag can be stored for the data associating a physical address with a logical address to invalidate that data. As used herein, the term "invalid flag" refers to one or more bits that are recognized as invalidating data that is associated with the flag.

In another alternate embodiment, mapping logical addresses to physical addresses is performed primarily or entirely by circuitry in the memory device. The logical-to-physical redirection is accomplished in the memory device transparent to the user. A mapping table is provided in bit locations beyond the bit location of the user's bits in a block of data. In the write once memory of this preferred embodiment, the initial state is called Logic 1. Therefore, the initial entry of the map data is all 1's. This initial state is interpreted by the logic to mean the logical address is not redirected but that the logical address equals the physical address. Every block of data has a table entry. Preferably, the size of the data block is the size of the redundant replacement unit. The table entry can be changed to the address of any redundant block physical address on the chip. It is also possible to use associations of logical to physical addresses that restrict the choice to less than the entire chip. However, due to the one-to-one correspondence of table entries to logical addresses, the full choice of chip locations is efficient.

When an entry other than 1's is found in the table, the logical address is not used, but the chip logic uses the stored mapping data in the table as the block physical address. The block physical address is the location of a redundant block of memory locations. Preferably the redundant block address is different from any valid block logical address on the memory device. The address redirection is preferably combined with the operation on the memory device of moving the block of data from a temporary storage location called a page register to or from the main memory array locations.

An example of the logic flow that could be used to carry out the redirection is in two parts, i.e., a read operation and a write operation. The table entry could have a "used" indicator bit and a redundancy physical address.

Read Command: Read the table entry for address at the logical page address. If all 1's, read data at the logical address. If not all 1's, read the table data at the redundant physical address. Repeat until all 1's and the user data can be read.

Write command: Read the table entry. (a) If all 1's, including the used bit, write data at the logical address, then set the used bit to 0. Then (b) If the table entry has an address other than 1's, read the table entry at the indicated physical address location and start at the top of this decision tree again. Then (c) if the used bit is set to 0, choose a redundant location that has not been used, write data at the chosen location, write the used bit at the chosen location, and write a table entry at the original table entry. A table address entry indicates that the original data is no longer valid.

Partial write operations are accomplished by an enhancement to decision step (c). Partial write is a request to write a block of data while the user has only given valid data bits for a portion of the block. Other data bits are assumed to be 1 or unchanged. The enhancement to (c) is a step (d) If the table address is all ones, try to write the data at the address and then read to verify the write. If successful, write the used bit to 0. If not successful, choose a redundant location that has not been used, write data at the chosen location, write the used bit at the chosen location, and write a table entry at the original table entry.

Alternatively, the used bit is unnecessary if every write is done with write verify logic. (a) is a write verify operation (d), and (b) is the same, (c) is not needed.

Advantages include that the user need not build a mapping table and neither block flags nor block address fields modifications are required. Increased on-chip logic and a small number of extra memory cells are needed and additional latency to read multiply rewritten data is incurred. This could be the preferred solution for some applications.

As described above, the memory device in these preferred embodiments is a write-once memory device. A write-once memory device comprises field-programmable storage locations that are fabricated in an initial, un-programmed digital state and can be switched to an alternative, programmed digital state at a time after fabrication. For example, the original, un-programmed digital state can be identified as the Logic 1 (or Logic 0) state, and the programmed digital state can be identified as the Logic 0 (or Logic 1) state. Because the memory cells are write-once, an original, un-programmed digital state of a storage location (e.g., the Logic 1 state) cannot be restored once switched to a programmed digital state (e.g., the Logic 0 state). A memory device is considered write-once even if it contains a secondary write-many memory unit. The preferred embodiments described herein can also be used with a write-many memory device.

The memory device can take any suitable form, such as a solid-state memory device (i.e., a memory device that responds to electrical read and write signals to cause digital information to be read from and stored in a memory array of the device), a magnetic storage device (such as a hard drive), or an optical storage device (such as a CD or DVD). A memory device can comprise memory cells organized in a two-dimensional or three-dimensional array. In one preferred embodiment, the memory device takes the form of a solid-state memory device having a three-dimensional array of non-volatile write-once memory cells, as described in U.S. Pat. No. 6,034,882 to Johnson et al., U.S. Pat. No. 5,835,396 to Zhang, and U.S. patent application Ser. No. 09/560,626 (now abandoned), all of which are hereby incorporated by reference. As discussed in those documents, three-dimensional memory arrays provide important economies in terms of reduced size and associated reductions in manufacturing cost. Although any suitable type of memory cell can be used, in one preferred embodiment, the memory cell comprises an anti-fuse and a diode. The memory array can be made from any suitable material. In one preferred embodiment, the memory array comprises a semiconductor material. Other materials can be used, such as, but not limited to, phase-change materials and amorphous solids as well as those used with MRAM and organic passive element arrays, as described in U.S. Pat. No. 6,055,180, which is hereby incorporated by reference. It is important to note that the following claims should not be read as requiring a specific type of memory array (e.g., two-dimensional or three-dimensional) or material unless explicitly recited therein.

Figure 6:
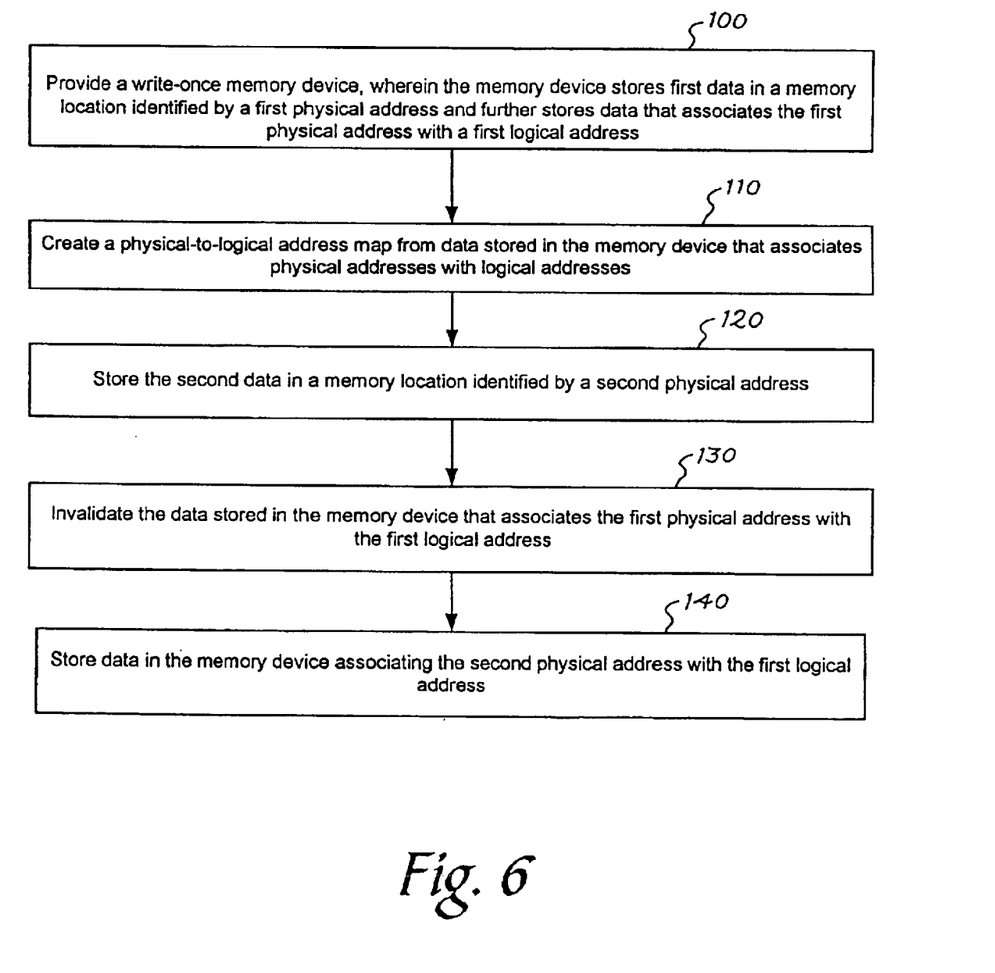
FIG. 6 is a flowchart of a method for re-writing to a logical address of a write-once memory device of a preferred embodiment.

Turning again to the drawings, FIG. 6 is a flowchart of a method for re-writing to a logical address of a write-once memory device. This method comprises the following: provide a write-once memory device, wherein the memory device stores first data in a memory location identified by a first physical address and further stores data that associates the first physical address with a first logical address (100), create a physical-to-logical address map from data stored in the memory device that associates physical addresses with logical addresses (110), store the second data in a memory location identified by a second physical address (120), invalidate the data stored in the memory device that associates the first physical address with the first logical address (130), and store data in the memory device associating the second physical address with the first logical address (140).

Figure 7:
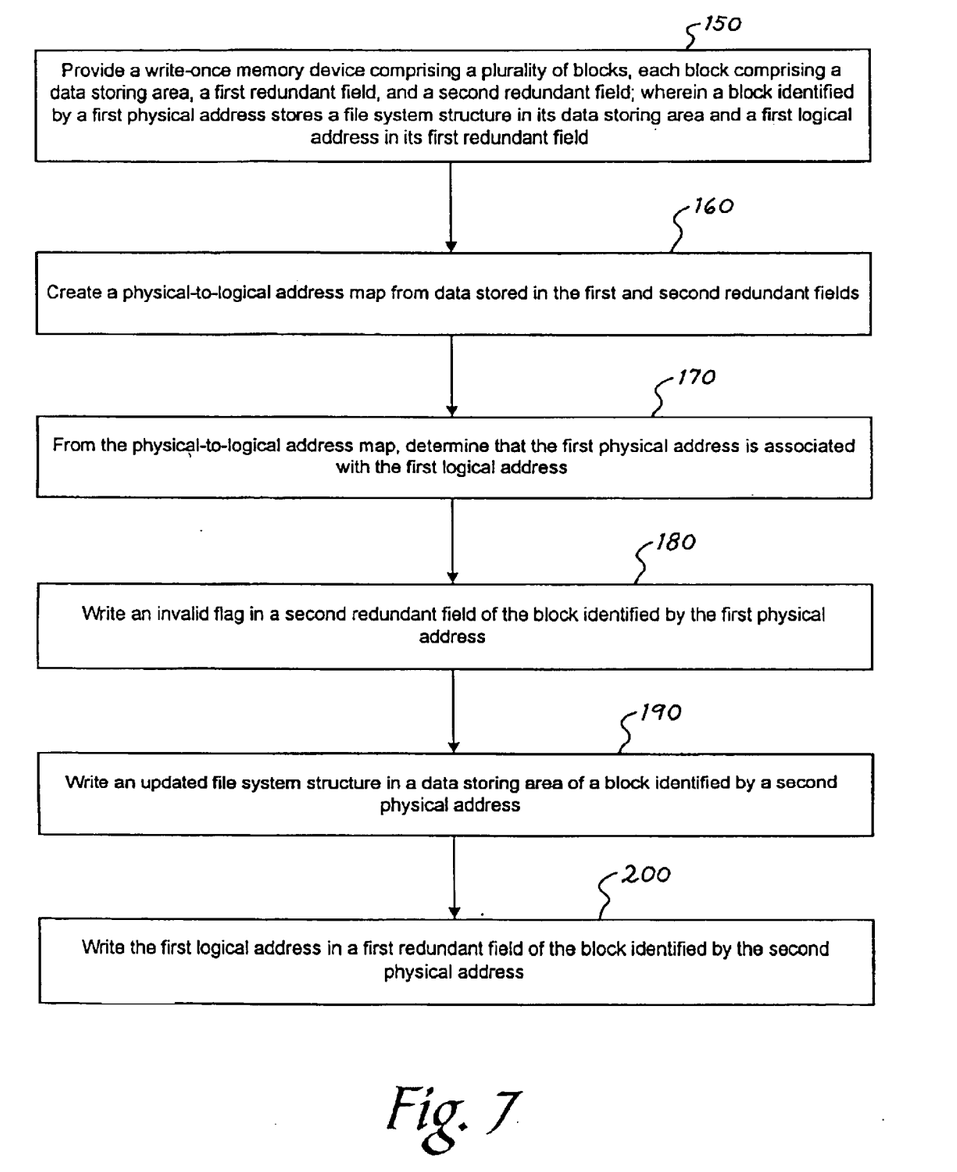
FIG. 7 is a flowchart of a method for storing a file system structure in a write-once memory device of a preferred embodiment.

FIG. 7 is a flowchart of a method for storing a file system structure in a write-once memory device. This method comprises the following: provide a write-once memory device comprising a plurality of blocks, each block comprising a data storing area, a first redundant field, and a second redundant field; wherein a block identified by a first physical address stores a file system structure in its data storing area and a first logical address in its first redundant field (150), create a physical-to-logical address map from data stored in the first and second redundant fields (160), from the physical-to-logical address map, determine that the first physical address is associated with the first logical address (170), write an invalid flag in a second redundant field of the block identified by the first physical address (180), write an updated file system structure in a data storing area of a block identified by a second physical address (190), and write the first logical address in a first redundant field of the block identified by the second physical address (200).

Figure 8:
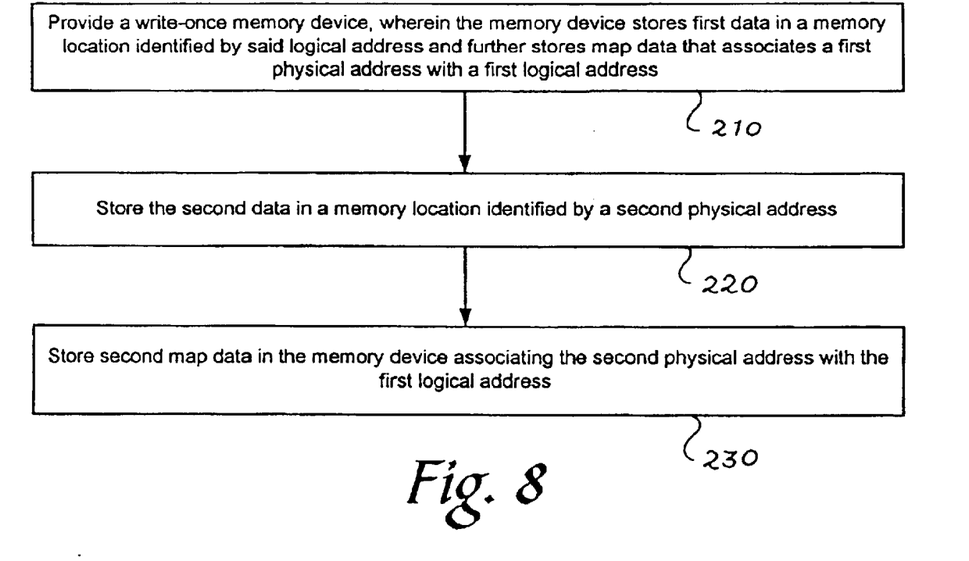
FIG. 8 is a flowchart of a method for re-writing to a logical address of a write-once memory device of a preferred embodiment.

FIG. 8 is a flowchart of a method for re-writing to a logical address of a write-once memory device. This method comprises the following: provide a write-once memory device, wherein the memory device stores first data in a memory location identified by said logical address and further stores map data that associates a first physical address with a first logical address (210), store the second data in a memory location identified by a second physical address (220), and store second map data in the memory device associating the second physical address with the first logical address (230).

Figure 9:
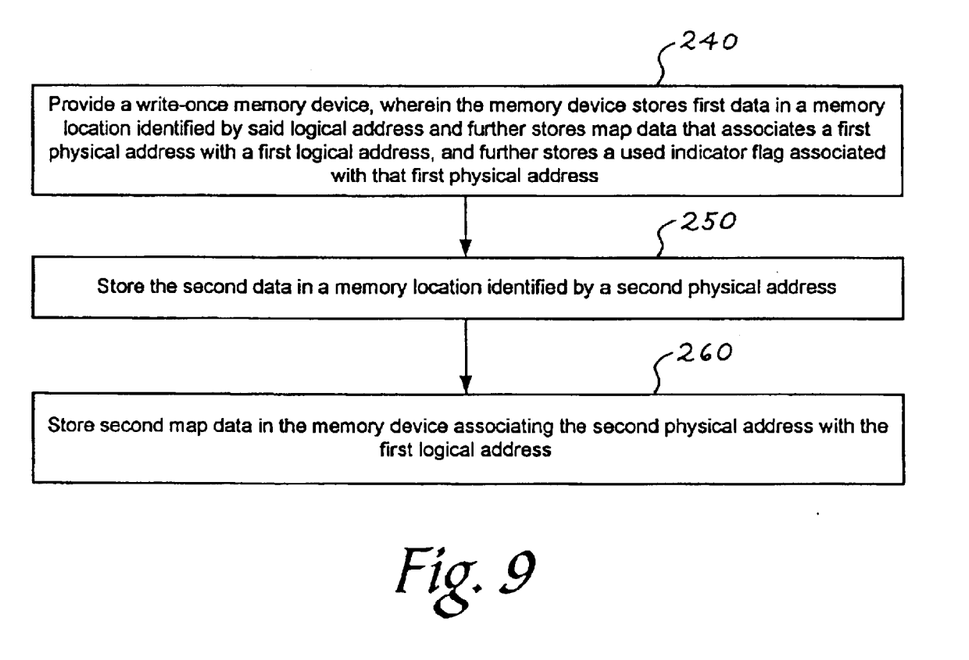
FIG. 9 is a flowchart of a method for re-writing to a logical address of a write-once memory device of a preferred embodiment.

FIG. 9 is a flowchart of a method for re-writing to a logical address of a write-once memory device. This method comprises the following: provide a write-once memory device, wherein the memory device stores first data in a memory location identified by said logical address and further stores map data that associates a first physical address with a first logical address, and further stores a used indicator flag associated with that first physical address (240), store the second data in a memory location identified by a second physical address (250), and store second map data in the memory device associating the second physical address with the first logical address (260).

Figure 10:
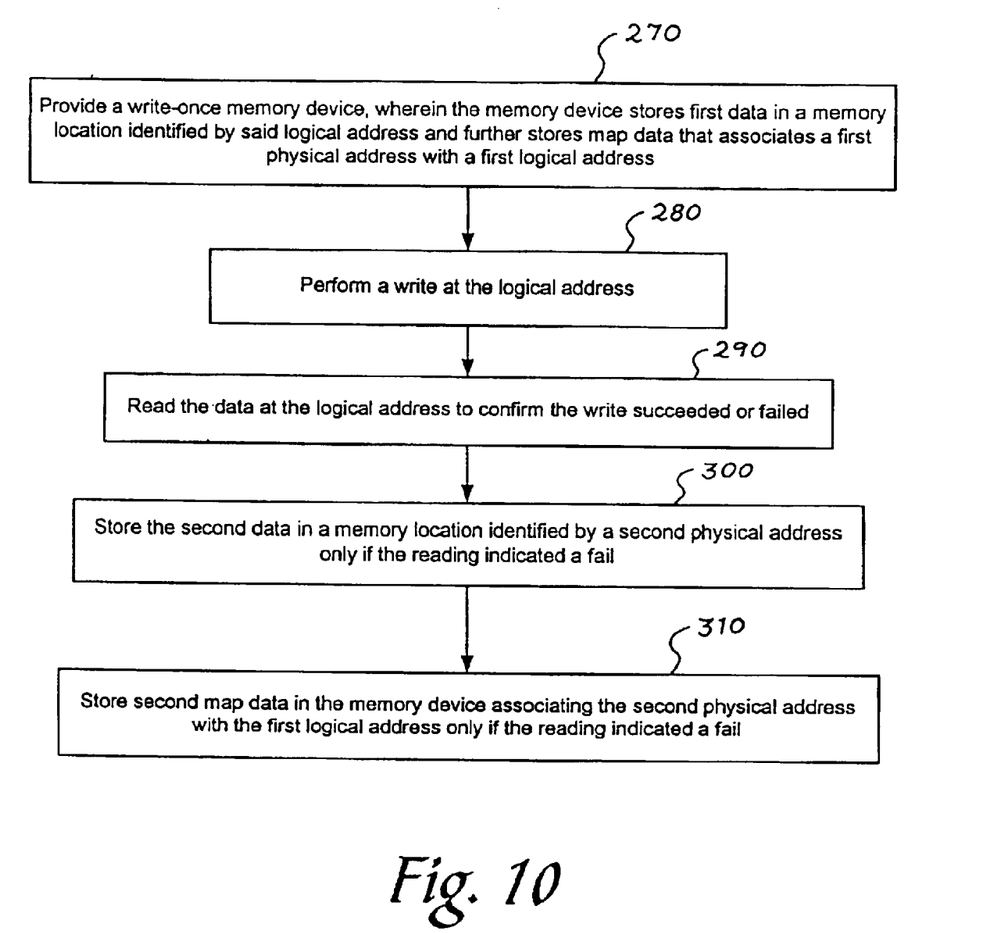
FIG. 10 is a flowchart of a method for re-writing to a logical address of a write-once memory device of a preferred embodiment.

FIG. 10 is a flowchart of a method for re-writing to a logical address of a write-once memory device. This method comprises the following: provide a write-once memory device, wherein the memory device stores first data in a memory location identified by said logical address and further stores map data that associates a first physical address with a first logical address (270), perform a write at the logical address (280), read the data at the logical address to confirm the write succeeded or failed (290), store the second data in a memory location identified by a second physical address only if the reading indicated a fail (300), and store second map data in the memory device associating the second physical address with the first logical address only if the reading indicated a fail (310).

In one preferred embodiment, the memory device takes the form of a modular, compact, handheld unit, such as a memory card or stick, that comprises an external electrical connector that can be coupled with a host device. As used herein, the term "coupled with" means directly coupled with or indirectly coupled with through one or more intervening components. The host device can be a data storage device and/or a data reading device and can take the form of a digital camera, digital audio player, or other portable consumer product, for example. The memory device and host device can take other forms.

It is intended that the foregoing detailed description be understood as an illustration of selected forms that the invention can take and not as a definition of the invention. It should also be noted that a host device or memory device in compliance with the SmartMedia™ specification is not required by the claims unless explicitly recited therein. It is only the following claims, including all equivalents, that are intended to define the scope of this invention. Finally, it should be noted that any aspect of any of the preferred embodiments described herein can be used alone or in combination with one another.

What is claimed is:

1. A method for re-writing to a logical address of a write-once memory device, the method comprising:
   (a) providing a write-once memory device, wherein the write-once memory device stores first data in a memory location identified by a first physical address and further stores data that associates the first physical address with a first logical address;
   (b) creating a physical-to-logical address map from data stored in the write-once memory device that associates physical addresses with logical addresses; and
   (c) in response to a command to write second data to the first logical address:
      (c1) storing the second data in a memory location identified by a second physical address;
      (c2) invalidating the data stored in the write-once memory device that associates the first physical address with the first logical address; and
      (c3) storing data in the write-once memory device associating the second physical address with the first logical address.

2. The invention of claim 1 further comprising:
   (d) in response to a command to read the first logical address, reading the second data in the memory location identified by the second physical address instead of the first data in the memory location identified by the first physical address.

3. The invention of claim 1, wherein (b) and (c) are performed with a controller in the write-once memory device.

4. The invention of claim 1, wherein (b) and (c) are performed with software in a host device coupled with the write-once memory device.

5. The invention of claim 4, wherein the software comprises a file system.

6. The invention of claim 1, wherein (b) and (c) are performed with hardware in a host device coupled with the write-once memory device.

7. The invention of claim 1, wherein (b) and (c) are performed with logic circuitry within the write-once memory device.

8. The invention of claim 1, wherein the data associating physical addresses and logical addresses is stored in redundant fields of memory locations of the write-once memory device.

9. The invention of claim 1, wherein the data associating physical addresses and logical addresses is stored in a table in the write-once memory device.

10. The invention of claim 9, wherein a number of entries of the table is equal to a number of logical addresses in the write-once memory device.

11. The invention of claim 1, wherein (c2) comprises obliterating the data associating the first physical address with the first logical address.

12. The invention of claim 1, wherein (c2) comprises storing an invalid flag for the data associating the first physical address with the first logical address.

13. The invention of claim 1, wherein the data is invalidated in (c2) by the act of storing the data in (c3).

14. The invention of claim 1, wherein the first data comprises a file system structure, and wherein the second data comprises an updated file system structure.

15. The invention of claim 14, wherein the file system structure comprises a file allocation table.

16. The invention of claim 14, wherein the file system structure comprises a root directory.

17. The invention of claim 14, wherein the file system structure comprises a sub-directory.

18. The invention of claim 1 further comprising storing the data that associates the first physical address with a first logical address in the write-once memory device with a controller in the write-once memory device.

19. The invention of claim 1 further comprising storing the data that associates the first physical address with a first logical address in the write-once memory device with software in a host device coupled with the write-once memory device.

20. The invention of claim 19, wherein the software comprises a file system.

21. The invention of claim 1 further comprising storing the data that associates the first physical address with a first logical address in the write-once memory device with hardware in a host device coupled with the write-once memory device.

22. The invention of claim 1, wherein the physical-to-logical address map is created in accordance with SmartMedia™ Physical Format Specifications Version 1.30.

23. A method for storing a file system structure in a write-once memory device, the method comprising:
   (a) providing a write-once memory device comprising a plurality of blocks, each block comprising a data storing area, a first redundant field, and a second redundant field; wherein a block identified by a first physical address stores a file system structure in its data storing area and a first logical address in its first redundant field;
   (b) creating a physical-to-logical address map from data stored in the first and second redundant fields;
   (c) from the physical-to-logical address map, determining that the first physical address is associated with the first logical address;
   (d) writing an invalid flag in a second redundant field of the block identified by the first physical address;
   (e) writing an updated file system structure in a data storing area of a block identified by a second physical address; and
   (f) writing the first logical address in a first redundant field of the block identified by the second physical address.

24. The invention of claim 23, wherein (b)–(f) are performed with a controller in the write-once memory device.

25. The invention of claim 23, wherein (b)–(f) are performed with software in a host device coupled with the write-once memory device.

26. The invention of claim 25, wherein the software comprises a file system.

27. The invention of claim 23, wherein (b)–(f) are performed with hardware in a host device coupled with the write-once memory device.

28. The invention of claim 23 further comprising:
   (g) in response to a command to read the first logical address, reading the updated file system structure in the data storing area of the block identified by the second physical address instead of the file system structure in the data storing area of the block identified by the first physical address.

29. The invention of claim 23, wherein the file system structure comprises a file allocation table.

30. The invention of claim 23, wherein the file system structure comprises a root directory.

31. The invention of claim 23, wherein the file system structure comprises a sub-directory.

32. The invention of claim 23, wherein the first redundant field comprises block address field-1.

33. The invention of claim 23, wherein the first redundant field comprises block address field-2.

34. The invention of claim 23, wherein the second redundant field comprises a data status flag field.

35. The invention of claim 23, wherein the second redundant field comprises a block status flag field.

36. The invention of claim 23, wherein the physical-to-logical address map is created in accordance with SmartMedia™ Physical Format Specifications Version 1.30.

37. A method for re-writing to a logical address of a write-once memory device, the method comprising:
 (a) providing a write-once memory device, wherein the write-once memory device stores first data in a memory location identified by said logical address and further stores map data that associates a first physical address with a first logical address; and
 (b) in response to a command to write second data to the first logical address:
  (b1) storing the second data in a memory location identified by a second physical address; and
  (b2) storing second map data in the write-once memory device associating the second physical address with the first logical address.

38. The invention of claim 37, wherein the first physical address equals the logical address.

39. The invention of claim 37, wherein the data that associates the first physical address with a first logical address has an initial default value which indicates first physical address equals the logical address.

40. The invention of claim 37, wherein the map data has a one-to-one correspondence with the logical addresses of the write-once memory device.

41. The invention of claim 37, wherein the second physical address is not equal to any valid logical address of the write-once memory device.

42. The invention of claim 37, wherein the second map data is stored in the same location and over writes first map data.

43. The invention of claim 37 further comprising:
 (c) in response to a command to read first logical address:
  (c1) reading the map data associated with the logical address; and
  (c2) reading the data at the indicated physical address.

44. The invention of claim 37 further comprising storing an used flag for the data associated with the logical address.

45. A method for re-writing to a logical address of a write-once memory device, the method comprising:
 (a) providing a write-once memory device, wherein the write-once memory device stores first data in a memory location identified by said logical address and further stores map data that associates a first physical address with a first logical address, and further stores a used indicator flag associated with that first physical address; and
 (b) in response to a command to write second data to the first logical address:
  (b1) storing the second data in a memory location identified by a second physical address; and
  (b2) storing second map data in the write-once memory device associating the second physical address with the first logical address.

46. The invention of claim 45 further comprising:
 (b3) storing a used indicator flag associated with the second physical address.

47. The invention of claim 45, wherein the map data associating physical addresses and logical addresses is stored in a table in the write-once memory device.

48. The invention of claim 47, wherein a number of entries of the table is equal to a number of block logical addresses in the write-once memory device.

49. A method for re-writing to a logical address of a write-once memory device, the method comprising:
 (a) providing a write-once memory device, wherein the write-once memory device stores first data in a memory location identified by said logical address and further stores map data that associates a first physical address with a first logical address; and
 (b) in response to a command to write second data to the first logical address:
  (b1) performing a write at the logical address;
  (b2) reading the data at the logical address to confirm the write succeeded or failed;
  (b3) storing the second data in a memory location identified by a second physical address only if the reading indicated a fail; and
  (b4) storing second map data in the write-once memory device associating the second physical address with the first logical address only if the reading indicated a fail.

* * * * *